(12) United States Patent
Oishi et al.

(10) Patent No.: US 8,080,298 B2
(45) Date of Patent: Dec. 20, 2011

(54) REFRIGERANT HOSE

(75) Inventors: Hideyuki Oishi, Kanagawa (JP); Kazuto Yamakawa, Kanagawa (JP); Koji Sato, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/663,049

(22) PCT Filed: Dec. 26, 2008

(86) PCT No.: PCT/JP2008/073747
§ 371 (c)(1),
(2), (4) Date: Jul. 1, 2010

(87) PCT Pub. No.: WO2010/073375
PCT Pub. Date: Jul. 1, 2010

(65) Prior Publication Data
US 2011/0186170 A1 Aug. 4, 2011

(30) Foreign Application Priority Data
Dec. 26, 2008 (JP) ................... 2009-522048

(51) Int. Cl.
*B32B 1/08* (2006.01)
*B32B 25/00* (2006.01)
(52) U.S. Cl. ...... 428/36.8; 428/35.7; 138/118; 138/137; 138/140
(58) Field of Classification Search .................. 428/36.8, 428/35.7; 138/118, 137, 140
See application file for complete search history.

(56) References Cited

U.S. PATENT DOCUMENTS

| | | | | |
|---|---|---|---|---|
| 5,162,445 A | * | 11/1992 | Powers et al. | 525/333.4 |
| 6,009,910 A | * | 1/2000 | Shibano | 138/126 |
| 6,051,653 A | * | 4/2000 | McElrath et al. | 525/195 |
| 6,548,585 B1 | * | 4/2003 | Ozawa et al. | 524/432 |

FOREIGN PATENT DOCUMENTS

| | | |
|---|---|---|
| JP | 3074700 B2 | 8/2000 |
| JP | 2001165358 A | 6/2001 |
| JP | 2002079614 A | 3/2002 |
| JP | 2006002877 A | 1/2006 |
| JP | 3891718 B2 | 3/2007 |
| JP | 2008291910 A | 12/2008 |

* cited by examiner

*Primary Examiner* — Michele L Jacobson
(74) *Attorney, Agent, or Firm* — Carrier Blackman & Associates, P.C.; Joseph P. Carrier; William D. Blackman

(57) ABSTRACT

An object of the present invention is to provide a hose which has a gas barrier layer and a rubber layer adhered without using an adhesive, and which has a dramatically improved durability compared to the conventional hose. The hose of the present invention is a refrigerant hose having an inner layer comprising a gas barrier layer and a rubber layer adhered to the outer surface of the gas barrier layer. The gas barrier layer comprises a modified polyamide prepared by blending a polyamide and a carboxyl group-containing modified polyolefin, and the rubber layer comprises a rubber composition prepared by blending a particular amount of an alkylphenol formaldehyde resin and a particular amount of carbon black with a raw rubber. The raw rubber comprises a BIMS, a copolymer rubber which is a butyl rubber and/or a halogenated butyl rubber, and an EPDM, the carbon black is specified, and no adhesive layer is formed between the gas barrier layer and the rubber layer.

4 Claims, 1 Drawing Sheet

REFRIGERANT HOSE

The entire contents of literatures cited in this specification are incorporated herein by reference.

BACKGROUND OF THE INVENTION

This invention relates to a refrigerant hose.

Use of a resin-rubber laminate comprising a resin material having a low gas permeability such as polyamide and a rubber material has become popular in producing a hose used for delivering a refrigerant in automobile air conditioner and the like. When the adhesion between the resin material and the rubber material is insufficient in such a resin-rubber laminate, a gas or a liquid may become clogged at the boundary between the resin material and the rubber material, and a bulge will be formed in the resin at the site of the clogging. This problem has been usually obviated by the application of an adhesive or surface treatment on the resin material. JP 3074700 B, for example, discloses a refrigerant hose having a gas barrier layer and a rubber layer comprising a particular rubber composition wherein the gas barrier layer is adhered to the rubber layer by using an adhesive.

However, the production needs to be conducted under certain conditions in order to realize the resin-rubber adhesion at the desired level by using an adhesive or the like, and this results not only in the increased number of production steps but also in the difficulty of conducting continuous production of the hose as well as the increased production cost. Use of an adhesive or the like is also associated with the problem of the use of an organic solvent which has harmful effects on the global environment.

In view of such situation, JP 3891718 B and JP 2002-079614 A propose a hose wherein the resin layer and the rubber layer are adhered without using any adhesive.

SUMMARY OF THE INVENTION

However, in the investigation by the inventors of the present invention, the hoses described in JP 3891718 B and JP 2002-079614 A were found to be insufficient in their durability.

Accordingly, an object of the present invention is to provide a hose wherein the gas barrier layer and the rubber layer are adhered without using any adhesive, and which has a dramatically improved durability compared to conventional hoses.

The inventors of the present invention made an intensive investigation, and found that in the refrigerant hose having an inner layer comprising a gas barrier layer and a rubber layer containing the particular components at the predetermined amount, the gas barrier layer and the rubber layer are firmly adhered without use of an adhesive, and that such hose has durability which is dramatically higher than conventional hoses. The present invention has been completed on the basis of such findings.

Accordingly, the present invention provides the following (1) to (3).

(1) A refrigerant hose having an inner layer comprising a gas barrier layer and a rubber layer adhered to an outer surface of the gas barrier layer, wherein the gas barrier layer comprises a modified polyamide prepared by blending a polyamide and a carboxyl group-containing modified polyolefin;

the rubber layer comprises a rubber composition prepared by blending 1 to 15 parts by weight of an alkylphenol formaldehyde resin and 30 to 80 parts by weight of carbon black with respect to 100 parts by weight of a raw rubber;

the raw rubber comprises a BIMS (a brominated product of a copolymer rubber of an isomonoolefin and a p-alkyl styrene), a copolymer rubber which is a butyl rubber and/or a halogenated butyl rubber, and an EPDM (ethylene-propylene-diene terpolymer), a content of the BIMS in the raw rubber is 5 to 40 parts by weight, a total content of the BIMS and the copolymer rubber in the raw rubber is 20 to 80 parts by weight, and a content of the EPDM in the raw rubber is 80 to 20 parts by weight;

the carbon black has $N_2SA$ of at least 75 $m^2/g$ and a DBP absorption of at least 90 $cm^3/100$ g; and no adhesive layer is formed between the gas barrier layer and the rubber layer.

(2) The refrigerant hose according to (1) wherein the copolymer rubber is a halogenated butyl rubber.

(3) The refrigerant hose according to (1) or (2) wherein the polyamide is at least one member selected from the group consisting of polyamide 6, polyamide 11, polyamide 12, polyamide 4-6, polyamide 6-6, polyamide 6-10, polyamide 6-12, polyamide MXD-6, and a copolymer of at least two of the foregoing polyamides.

The present invention is capable of providing a hose in which the gas barrier layer and the rubber layer are adhered to each other even without the use of an adhesive, and which has durability dramatically higher than the conventional hoses.

DETAILED DESCRIPTION OF THE INVENTION

Figure 1:
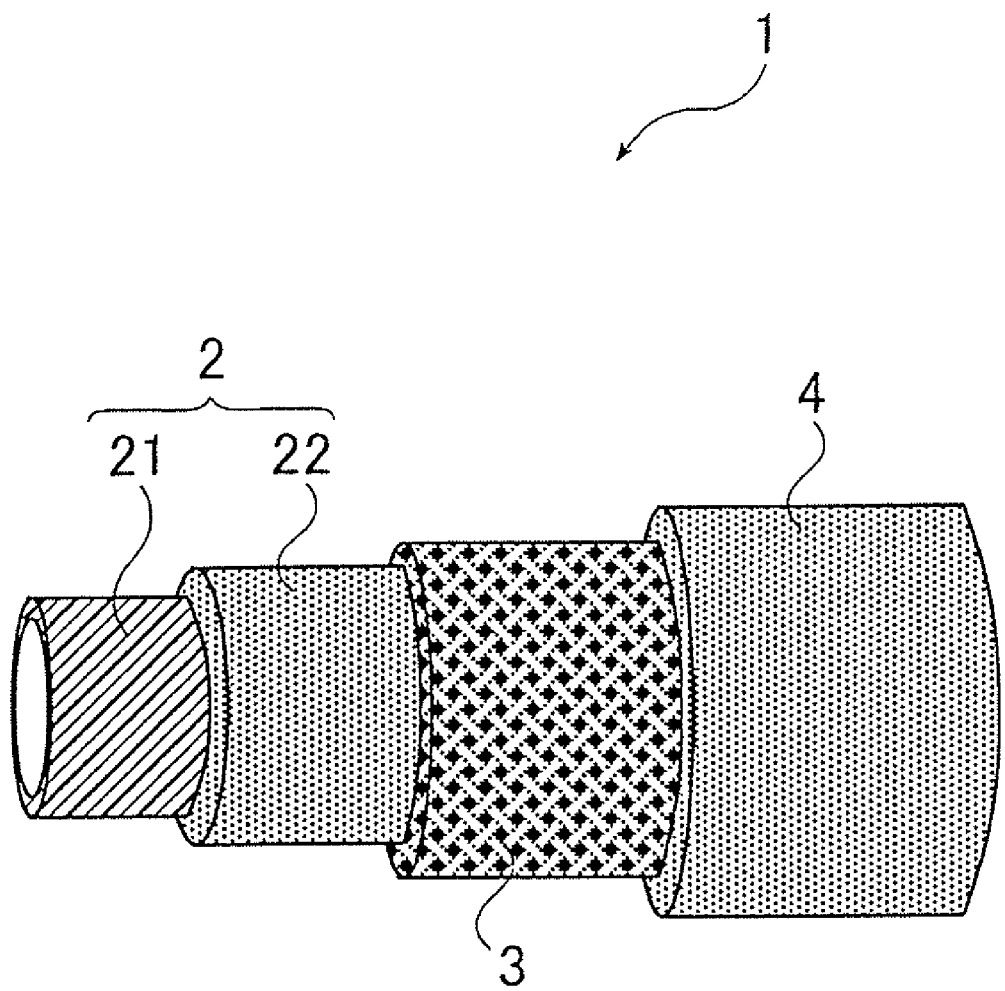
FIG. 1 is a perspective view of a preferred embodiment of the hose of the present invention.

Next, the hose of the present invention is described in detail.

The hose of the present invention is a refrigerant hose having an inner layer comprising a gas barrier layer and a rubber layer which is adhered to an outer surface of the gas barrier layer. No adhesive layer is present between the gas barrier layer and the rubber layer. The hose solely comprising the inner layer with no other layer is also within the scope of the hose of the present invention.

The constitution of the hose of the present invention is as described below. However, the hose of the present invention may have a constitution which is the same as the conventional hoses.

<Gas Barrier Layer>

First, the gas barrier layer is described.

The gas barrier layer of the hose of the present invention comprises a modified polyamide prepared by blending a polyamide and a carboxyl group-containing modified polyolefin.

The gas barrier layer is within the scope of the present invention as long as it comprises such a modified polyamide and this layer may also contain other components such as additives to the extent that the objects of the present invention are not adversely affected, and a gas barrier layer containing such other components is also within the scope of the present invention.

The polyamide is not particularly limited, and the preferred are at least one member selected from the group consisting of polyamide 6, polyamide 11, polyamide 12, polyamide 4-6, polyamide 6-6, polyamide 6-10, polyamide 6-12, polyamide MXD-6, and a copolymer of at least two of the foregoing polyamides.

Preferable examples of the carboxyl group-containing modified polyolefin include a modified polyolefin having about 0.1 to 10% by mole of the functional group introduced therein. This modified polyolefin may be produced by graft polymerization of a polyolefin prepared by homopolymerization or copolymerization of an olefin or a diene monomer such as ethylene, propylene, or butadiene; with an acid anhydride such as maleic anhydride.

The polyamide and the carboxyl group-containing modified polyolefin may be blended at a ratio (ratio by weight) of preferably 90/10 to 50/50, and more preferably 85/15 to 65/35. When the carboxyl group-containing modified polyolefin is used at an excessively high ratio, the hose of the present invention will enjoy high flexibility, but with increased risk of the reduced resistance to refrigerant permeability. On the other hand, use of excessively low ratio of the carboxyl group-containing modified polyolefin will invite improved resistance to refrigerant permeability, but with the sacrifice of the adhesion with the rubber layer and the flexibility.

Exemplary modified polyamides include Zytel ST series manufactured by DuPont such as Zytel ST801, Zytel ST811, and Zytel ST811HS, which are presumably the products produced by alloying polyamide 6 with maleic anhydride modified polyolefine.

The gas barrier layer may be formed, for example, by extruding a tube of the modified polyamide as described above.

The gas barrier layer is not limited for its thickness. The thickness is preferably in the range of 0.01 to 0.50 mm, more preferably 0.05 to 0.30 mm, and most preferably 0.05 to 0.20 mm. When the thickness is within such range, the gas barrier layer will enjoy improved extrusion workability, resistance to refrigerant permeability, and flexibility.

<Rubber Layer>

Next, the rubber layer is described.

The rubber layer comprises a rubber composition prepared by blending a predetermined amount of an alkylphenol formaldehyde resin and a predetermined amount of carbon black with the raw rubber.

The rubber layer is within the scope of the present invention as long as it comprises the raw rubber, the alkylphenol formaldehyde resin, and the carbon black, and this layer may also contain other components to the extent that the objects of the present invention are attained, and a rubber layer containing such other components is also within the scope of the present invention.

First, the raw rubber is described.

The raw rubber comprises a BIMS, a copolymer rubber which is a butyl rubber and/or a halogenated butyl rubber, and an EPDM.

Here, the BIMS contained in the raw rubber is described.

The BIMS is a brominated product of a copolymer rubber of an isomonoolefin containing 4 to 7 carbon atoms and a p-alkyl styrene, and the BIMS has a p-alkyl styrene (PAS) content of 5 to 25% by weight and a bromine (Br) content of at least 1.5% by weight, with a weight ratio of the p-alkyl styrene unit to the bromine unit of $0.15 \leq Br/PAS \leq 0.40$. Mooney viscosity (ML1+8, 125° C.) is at least 30.

A typical example of the isomonoolefin containing 4 to 7 carbon atoms is isobutylene. Examples of the p-alkyl styrene include a styrene having an alkyl group containing 1 to 5 carbon atoms at its para-position such as p-methylstyrene and p-ethylstyrene. The content of the p-alkyl styrene (content of all those having the p-alkyl styrene backbone including those having the brominated alkyl group) in the BIMS is 5 to 25% by weight, and preferably 5 to 10% by weight. When the content is 5% by weight or more, the layer will exhibit resistance to refrigerant permeability, and when the content is up to 25% by weight, the rubber composition will not be brittle even at low temperature, and the layer will exhibit high resistance to the low temperature.

BIMS is commercially available, for example, from Exxonmobil Chemical Company (EXXPRO series). More specifically, Exxpro 3745 from Exxonmobil Chemical Company is a brominated product of the copolymer rubber of isobutylene and p-methylstyrene.

Next, the copolymer rubber contained in the raw rubber is described.

The copolymer rubber is a butyl rubber and/or a halogenated butyl rubber, and preferably, a halogenated butyl rubber in view of the improved durability of the resulting hose of the present invention.

The butyl rubber used is not particularly limited, and any isobutylene-isoprene rubber commonly used in the art can be used. The isoprene content may be 0.6 to 2.5% by mole in terms of the degree of unsaturation, and the molecular weight is preferably 35 to 60 (125° C.) in terms of the Mooney viscosity. Exemplary halogenated butyl rubbers include chlorinated butyl rubber and brominated butyl rubber. The halogenated butyl rubber may also be any halogenated butyl rubber commonly used in the art, and in the case of the chlorinated butyl rubber, the chlorine content may be 1 to 2.5% by weight and the isoprene content may be 0.6 to 2.5% by mole in terms of the degree of unsaturation, and the molecular weight may be 30 to 60 (125° C.) in terms of the Mooney viscosity. In the case of the brominated butyl rubber, the bromine content may be 1 to 2.5% by weight, and the isoprene content may be 0.6 to 2.5% by mole in terms of the degree of unsaturation, and the molecular weight may be 25 to 55 (125° C.) in terms of the Mooney viscosity.

The EPDM contained in the raw rubber is not particularly limited as long as it is the copolymer rubber commonly used in the art comprising ethylene, propylene, and diene. Exemplary commercially available products include Mitsui EPT 4070 manufactured by Mitsui Chemicals Inc. The propylene content is preferably 10 to 70% by mole, and more preferably 15 to 50% by mole. Exemplary diene components include ethylidene norbornene, dicyclopentadiene, and 1,4-hexadiene, and the preferred is ethylidene norbornene having high crosslinking speed. The content of the diene component is preferably 3 to 25, and more preferably 5 to 20 in terms of the iodine value.

The content of the BIMS in the raw rubber is 5 to 40 parts by weight, and the total content of the BIMS and the copolymer rubber which is the butyl rubber and/or the halogenated butyl rubber is 20 to 80 parts by weight, and the content of the EPDM is 80 to 20 parts by weight.

When the BIMS content is less than 5 parts by weight, the required rubber adhesion is not realized, and formation of the adhesive rubber layer on the surface of the gas barrier layer to the required thickness will be difficult. When the BIMS content is in excess of 40 parts by weight, realization of the required adhesion will be difficult, and firm adhesion of the rubber layer on the surface of the gas barrier layer will be difficult.

The content of the EPDM is preferably 70 to 50 parts by weight.

When the EPDM content is less than 20 parts by weight, the adhesion and the rubber adhesion of the required level will not be realized. When the EPDM content is in excess of 80 parts by weight, hose productivity will be reduced due to the reduced vulcanization speed.

Next, the alkylphenol formaldehyde resin is described.

The alkylphenol formaldehyde resin functions as the vulcanizer for the raw rubber.

The alkylphenol formaldehyde resins include the alkylphenol formaldehyde resins which have been halogenated (i.e. the halogenated alkylphenol formaldehyde resins), and among these, the preferred is a brominated alkylphenol formaldehyde resin.

The alkylphenol formaldehyde resin used may be a commercially available product such as TACKROL 250-1 manufactured by Taoka Chemical Co., Ltd.

The alkylphenol formaldehyde resin may be blended at an amount of 1 to 15 parts by weight, preferably at 2 to 10 parts by weight, and more preferably 2 to 7 parts by weight in relation to 100 parts by weight of the raw rubber. When used at an amount less than 1 part by weight, the required adhesion may not be realized, and in particular, firm adhesion of the rubber layer on the surface of the gas barrier layer may become difficult. When used at an amount in excess of 15 parts by weight, the rubber layer may suffer from insufficient physical properties (hardness).

Next, the carbon black is described.

The carbon black used in the present invention has the colloidal properties including a $N_2SA$ of at least 75 $m^2/g$ and a DBP absorption of at least 90 $cm^3/100$ g. When the $N_2SA$ is less than 75 $m^2/g$ or the DBP absorption is less than 90 $cm^3/100$ g, firm adhesion of the rubber layer to the surface of the gas barrier layer will be difficult. The $N_2SA$ is preferably in the range of 80 to 150 $m^2/g$, and more preferably 80 to 120 $m^2/g$. The DBP absorption is preferably 95 to 140 $cm^3/100$ g, and more preferably 100 to 130 $cm^3/100$ g.

The $N_2SA$ means the amount of nitrogen adsorbed on the surface of the carbon black, and more specifically, the value determined by the method defined in JIS K 6217-2.

The DBP absorption means the amount of oil adsorbed on the carbon black aggregate, and more specifically, the value determined by the method defined in JIS K 6217-4.

The carbon black may be blended at an amount of 30 to 80 parts by weight, and preferably at 40 to 65 parts by weight in relation to 100 parts by weight of the raw rubber. When used at less than 30 parts by weight, it is likely that the required adhesion may not be realized, and firm adhesion of the rubber layer to the surface of the gas barrier layer will be difficult. When used at an amount in excess of 80 parts by weight, viscosity of the unvulcanized rubber will be unduly high and this will result in the poor workability.

The rubber layer may also contain components other than the raw rubber, the alkylphenol formaldehyde resin, and the carbon black such as zinc oxide (ZnO), vulcanization aid, vulcanization accelerator, and other additives.

Exemplary vulcanization aids include fatty acids such as acetyl acid, propionic acid, butanoic acid, stearic acid, acrylic acid, and maleic acid; fatty acid salts of zinc such as zinc acetate, zinc propionate, zinc butanoate, zinc stearate, zinc acrylate, and zinc maleate.

Exemplary vulcanization accelerators include thiuram-based accelerators such as tetramethylthiuram disulfide (TMTD), and tetraethylthiuram disulfide (TETD); aldehyde-ammonia-based accelerators such as hexamethylenetetramine; guanidine-based accelerators such as diphenylguanidine; thiazole-based accelerators such as dibenzothiazyl disulfide (DM); and sulfenamide-based accelerators such as cyclohexyl benzothiazylsulfenamide.

Exemplary additives include fillers such as clay, softeners such as paraffin oils, plasticizers, processing aids, antiaging agents, and pigments.

The method used for producing the rubber composition by blending the raw rubber, the alkylphenol formaldehyde resin, and the carbon black is not particularly limited. For example, the rubber composition may be prepared by adding a predetermined amount of the carbon black, and optional additives such as paraffin oil and processing aid to the predetermined amount of the BIMS, the butyl rubber and/or the halogenated butyl rubber, and the EPDM, kneading the mixture by rolls, Banbury mixer, or the like, subsequently adding the predetermined amount of alkylphenol formaldehyde resin and other optional zinc oxide, vulcanization aid, vulcanization accelerator, and the like, and further kneading the mixture.

The rubber layer is not limited for its thickness.

The thickness, however, is preferably in the range of 0.5 to 3.0 mm.

The hose of the present invention is a refrigerant hose having an inner layer comprising such the gas barrier layer and the rubber layer as described above adhered to the outer surface of the gas barrier layer, which has no adhesive layer between the gas barrier layer and the rubber layer.

Unless the inner layer is the one comprising the gas barrier layer and the rubber layer containing the particular components as described above at the predetermined amount, the gas barrier layer and the rubber layer can not be firmly adhered by vulcanization without using the adhesive, and in other words, high adhesiveness (high adhesion power and high rubber adhesion) can not be realized.

The hose of the present invention is not limited for its inner diameter, outer diameter, and length.

The hose, however, may have an inner diameter preferably in the range of, for example, 5 to 20 mm, and more preferably 7 to 17 mm.

The hose of the present invention may further comprise a reinforcement layer, an outer layer, and the like as long as it has the inner layer.

The reinforcement layer is not particularly limited, and it may have either a braided structure or a coil structure, and it may be formed from a thread, wire, or the like. Exemplary reinforcement threads include those made by using a vinylon fiber, rayon fiber, polyester fiber, nylon fiber, an aromatic polyamide fiber, or the like, and exemplary reinforcement wires include hard steel wire, and more specifically, the one which has been brass-plated or zinc-plated to impart the wire with rust resistance and adhesiveness.

The outer layer is a layer provided in the exterior of the inner layer or the reinforcement layer, and it is not limited for its material, structure, thickness, or the like, and the outer layer may be formed by using a rubber composition, a resin, or a metal wire commonly used in the art. The rubber composition may be the same as the raw rubber as described above, and the rubber composition may have a vulcanizer, a filler, a reinforcing agent, a plasticizer, an antiaging agent, a vulcanization accelerator, a softener, a tackifier, a lubricant, a dispersant, a processing aid, or the like added in an adequate manner. Exemplary resins include polyamide resin, polyester resin, polyurethane resin, polyacetal resin, vinyl chloride resin, polypropylene, and polyethylene. If desired, a metal or a fiber may be included in the resin in order to improve the vibration absorption by weight increase or to improve the strength as long as the flexibility and vibration absorption capability of the hose are not sacrificed. The outer layer may have, for example, a solid or a spongy texture, and the outer layer may be either a sleeve type outer layer used by inserting the hose of the present invention in its interior, or a coil or spring type outer layer used by winding around the hose of the present invention.

The outer layer may preferably have a thickness of 1 to 5 mm, more preferably 0.5 to 3 mm, and most preferably 1 to 2 mm.

The outer layer may also comprise two or more layers.

Next, the structure of the hose of the present invention is described by referring to the drawing.

FIG. 1 is a view showing a preferred embodiment of the hose of the present invention.

In FIG. 1, the hose of the present invention 1 has an inner layer comprising a gas barrier layer 21 and a rubber layer 22 in close contact with the outer surface of the gas barrier layer 21. No adhesive layer is present between the gas barrier layer 21 and the rubber layer 22. The gas barrier layer 21 and the rubber layer 22 are firmly adhered to each other.

In this preferred embodiment, the hose has a reinforcement layer 3 on the exterior surface of the rubber layer 22, and an outer layer 4 on the exterior surface of the reinforcement layer 3.

The hose of the present invention is not limited to any particular type as long as it has the inner layer as described above, and the one having further layers in the exterior of the outer layer in the preferred embodiment as described above by referring to FIG. 1 is also within the scope of the present invention.

The hose of the present invention does not necessarily have a reinforcement layer as in the case of the preferred embodiment as described above. However, provision of the reinforcement layer is preferable for improving the tensile breaking strength, widening the tolerable pressure range, and ease of mounting metal fixture of the hose, and the provision of the reinforcement layer is particularly preferable when the hose is used for the application where the hose is used at a high pressure.

Next, the method for producing the hose of the present invention is described.

The method used for producing the hose of the present invention is not particularly limited, and any method known in the art can be employed.

For example, the gas barrier layer and the rubber layer can be produced by extrusion, and the rubber composition produced by the procedure as described above can be used for the rubber layer. In the case of the hose of the preferred embodiment as described above by referring to FIG. 1, the hose may be produced by disposing the rubber layer on the outer surface of the gas barrier layer, forming the reinforcement layer by braiding or winding a thread or wire over the rubber layer, disposing the exterior rubber layer, and then vulcanizing the entire hose. The vulcanization may be conducted at about 150 to 180° C.

In another method, the hose may be produced by forming the gas barrier layer, the rubber layer, the reinforcement layers, and the outer layer in this order over a mandrel, and vulcanizing these layers under the conditions of 140 to 190° C. for 30 to 180 minutes by press vulcanization, steam vulcanization, oven vulcanization (hot air vulcanization), or hot water vulcanization to have the layers adhered to each other.

EXAMPLES

Next, the hose of the present invention is described in further detail by referring to Examples which by no means limit the scope of the present invention.

<Test 1: Test for Evaluating Extrusion Workability of the Rubber Composition>

The following materials were mixed at the weight ratio (parts by weight) shown in Tables 1 to 3 to produce the rubber compositions in the respective Examples and Comparative Examples. More specifically, carbon black, paraffin oil, and stearic acid were added to the BIMS, the butyl rubber and/or the halogenated butyl rubber, and the EPDM, and the mixture was kneaded by rolls or Banbury mixer, and an alkylphenol formaldehyde resin and ZnO were added to produce the compositions.

Butyl rubber (IIR): EXXON BUTYL 268 manufactured by Japan Butyl Co., Ltd.

Chlorinated butyl rubber (Cl-IIR): EXXON CHLOROBUTYL 1066 manufactured by Japan Butyl Co., Ltd.

Brominated butyl rubber (Br-IIR): EXXON BROMOBUTYL 2255 manufactured by Japan Butyl Co., Ltd.

BIMS: Exxpro 3745 manufactured by Exxonmobil Chemical Company

EPDM: Mitsui EPT 4070 manufactured by Mitsui Chemicals, Inc.

Carbon black (C.B. (ISAF)): SHOBLACK N220 manufactured by SHOWA CABOT K.K.

Carbon black (C.B. (HAF)): SHOBLACK N330 manufactured by SHOWA CABOT K.K.

Carbon black (C.B. (FEF)): SHOBLACK N550 manufactured by SHOWA CABOT K.K.

Stearic acid: Lunac YA manufactured by Kao Corporation

Paraffin oil: Process oil 123 manufactured by Showa Shell Sekiyu K.K.

ZnO: zinc oxide type 3 manufactured by Seido Chemical Industry Co., Ltd.

Brominated alkylphenol formaldehyde resin: TACKROL 250-1 manufactured by Taoka Chemical Co., Ltd.

Of the carbon blacks, those indicated by ISAF or HAF meet the conditions of the $N_2SA$ of at least 75 $m^2/g$ and the DBP absorption of at least 90 $cm^3/100$ g while those indicated by FEF do not meet such conditions.

Next, the resulting rubber compositions were evaluated for the minimum Mooney viscosity. The minimum Mooney viscosity ($V_m$) means the value measured by Mooney scorch test according to JIS K 6300-1 at a temperature of 125° C.

The extrusion workability was confirmed by extruding the rubber composition from a compact screw extruder (with a compression type screw) having mounted with a head adapted for extruding a round bar. The extrusion was conducted at a head and cylinder temperature of 80° C. and a rotation speed of 60 rpm. The extrusion workability was evaluated "A" when outer appearance of the extruded composition was acceptable for a use as a hose and "B" when the appearance was not acceptable.

<Test 2: Physical Properties of the Rubber Composition>

Next, the resulting rubber compositions were vulcanized by using a press at 150° C. for 45 minutes at a surface pressure of 3.0 MPa to produce vulcanized sheets having a thickness of 2 mm. JIS No. 3 dumbbell test pieces were blanked from these sheets, and tensile test was conducted according to JIS K6251-2004 at a tensile speed of 500 mm/min to thereby measure tensile strength ($T_B$) [MPa], elongation at break ($E_B$) [%], and 100% modulus ($M_{100}$) [MPa] at room temperature (25° C.)

The vulcanized rubber compositions were also evaluated for their hardness ($H_S$) at room temperature by using Type A durometer according to JIS K6253-2006.

<Test 3: Adhesion Test>

Hoses comprising the inner layer were produced by using the rubber compositions of the Examples and the Comparative Examples and the modified polyamide.

More specifically, Zytel ST811HS (indicated as "Zytel" in the Tables) or a polyamide resin (indicated as "PA6" in the Tables) was first extruded on a mandrel (outer diameter, 11 mm) from an extruder to form a gas barrier layer having a thickness of 0.1 mm.

A rubber layer having a thickness of 1.4 mm was then formed on the outer surface of the thus formed gas barrier layer. After forming the rubber layer on the gas barrier layer, the hose was completed by vulcanizing the entire structure. The vulcanization was conducted by applying steam pressure at about 150 to 180° C. The resulting inner layer had a thickness of 1.5 mm and an outer diameter of 14 mm.

In Comparative Example 1-1, the gas barrier layer and the rubber layer were adhered by using an adhesive (Chemlok 402X manufactured by Lord Corporation).

The thus produced hoses were evaluated for adhesive strength and rubber adhesion by peeling the rubber layer at a peeling speed of 50 mm/min.

The adhesive strength is the adhesive strength (N) at a width of 25 mm, and the adhesive strength was evaluated "A" when it was at least 40 N/25 mm, and "B" when it was less than 40 N/25 mm.

The rubber adhesion was measured by the area ratio (%) of the remaining rubber. The remaining rubber was also measured for its thickness and indicated "thick", "thin", or "boundary" (the case where the rubber layer was peeled at the boundary between the gas barrier layer and the rubber layer). The rubber adhesion was evaluated "A" when "thick", "B" when "thin", and "C" when the rubber layer was peeled at the "boundary". The evaluation is also indicated in the Table.

<Test 4: Delamination Test>

The hose in each of the Examples and the Comparative Examples was prepared by repeating the procedure of Test 3. The hose had an inner diameter of 11 mm and an outer diameter of 18 mm (with the thickness of the inner layer of 1.5 mm). The length was 50 cm.

Next, a metal fixture was mounted on the hose, and a refrigerant (R-134a) was filled in the hose. The hose was then placed in an oven at 90° C. for 24 hours. In this test, the refrigerant was filled to 0.6 g/cm$^3$.

After releasing the refrigerant, the hose was immediately placed in an oven at 120° C. and allowed to stand for 24 hours.

The hose was then cut in half in axial direction to confirm the peeling (crevice) between the layers. The hose with no peeling was evaluated "A" and the one with peeling was evaluated "B".

<Test 5: Gas Permeability Test>

For each of the hoses of Example 3 and Example 4, four hoses of 50 cm each having a metal fitting at its opposite ends were prepared. The refrigerant was filled to 0.6 g/cm$^3$ in three of these four hoses. The remaining one hose was sealed without introducing the refrigerant. The permeability of the refrigerant R-134a was evaluated by measuring the weight after leaving for 24 hours and 96 hours at 100° C., and calculating the amount of gas permeation per 72 hours (g/m×72 h).

TABLE 1

|  | Comp. Ex. 1-1 | Comp. Ex. 1-2 | Comp. Ex. 2 | Comp. Ex. 3 | Comp. Ex. 4 | Comp. Ex. 5 | Comp. Ex. 6 |
|---|---|---|---|---|---|---|---|
| IIR [part by weight] | 100 | 100 |  |  |  |  |  |
| Cl-IIR [part by weight] |  |  |  |  |  |  |  |
| Br-IIR [part by weight] |  |  | 100 |  |  | 20 | 18 |
| BIMS [part by weight] |  |  |  | 100 |  |  | 2 |
| EPDM [part by weight] |  |  |  |  | 100 | 80 | 80 |
| Carbon black (ISAF) [part by weight] |  |  | 50 | 50 | 50 | 50 | 50 |
| Carbon black (HAF) [part by weight] | 80 | 80 |  |  |  |  |  |
| Carbon black (FEF) [part by weight] |  |  |  |  |  |  |  |
| Stearic acid [part by weight] | 3 | 3 | 2 | 2 | 2 | 2 | 2 |
| Paraffin oil [part by weight] | 10 | 10 | 5 | 5 | 5 | 5 | 5 |
| ZnO [part by weight] | 2 | 2 | 2 | 2 | 2 | 2 | 2 |
| Brominated alkylphenol formaldehyde resin [part by weight] | 8 | 8 | 3 | 3 | 3 | 3 | 3 |
| Minimum Mooney viscosity (Vm) [Mooney] | 57.8 | 57.8 | 69.6 | 68.4 | 42.6 | 48 | 49.7 |
| Extrusion workability | A | A | A | A | A | A | A |
| $T_B$ [MPa] | 9.2 | 9.2 | 13.2 | 11.4 | 5.4 | 16.5 | 16.8 |
| $E_B$ [%] | 635 | 635 | 565 | 120 | 530 | 430 | 425 |
| $M_{100}$ [MPa] | 2 | 2 | 2.5 | 10 | 2.3 | 3.7 | 4.1 |
| $H_S$ | 70 | 70 | 73 | 83 | 74 | 75 | 75 |
| Type of the gas barrier layer | Zytel | Zytel | Zytel | Zytel | Zytel | Zytel | Zytel |
| Adhesion strength [N/25 mm] | 79 | 35 | 43 | 29 | 25 | 66 | 69 |

TABLE 1-continued

|  |  |  |  |  |  |  |  |
|---|---|---|---|---|---|---|---|
| Evaluation of the adhesion strength | A | B | A | B | B | A | A |
| Rubber adhesion [%] | 90 (Thin) | 0 (Boundary) | 100 (Thin) | 100 (Thick) | 45 | 100 (Thin) | 100 (Thin) |
| Evaluation of the rubber adhesion | C | C | B | A | C | B | B |
| Delamination test | B | B | B | B | B | B | B |

|  | Ex. 1 | Ex. 2 | Ex. 3 | Ex. 4 | Ex. 5 | Ex. 6 |
|---|---|---|---|---|---|---|
| IIR [part by weight] |  |  |  |  |  |  |
| Cl-IIR [part by weight] |  |  |  |  |  | 32 |
| Br-IIR [part by weight] | 15 | 1 | 36 | 32 | 32 |  |
| BIMS [part by weight] | 5 | 19 | 9 | 13 | 13 | 13 |
| EPDM [part by weight] | 80 | 80 | 55 | 55 | 55 | 55 |
| Carbon black (ISAF) [part by weight] | 50 | 50 | 50 | 50 |  | 50 |
| Carbon black (HAF) [part by weight] |  |  |  |  | 50 |  |
| Carbon black (FEF) [part by weight] |  |  |  |  |  |  |
| Stearic acid [part by weight] | 2 | 2 | 2 | 2 | 2 | 2 |
| Paraffin oil [part by weight] | 5 | 5 | 5 | 5 | 5 | 5 |
| ZnO [part by weight] | 2 | 2 | 2 | 2 | 2 | 2 |
| Brominated alkylphenol formaldehyde resin [part by weight] | 3 | 3 | 3 | 3 | 3 | 3 |
| Minimum Mooney viscosity (Vm) [Mooney] | 50.2 | 51.6 | 50.5 | 51 | 47.2 | 50.7 |
| Extrusion workability | A | A | A | A | A | A |
| $T_B$ [MPa] | 17.2 | 16.9 | 17.1 | 17.2 | 16.5 | 17.4 |
| $E_B$ [%] | 410 | 360 | 400 | 380 | 430 | 350 |
| $M_{100}$ [MPa] | 4.2 | 4.9 | 4.3 | 4.5 | 3.8 | 4.6 |
| $H_S$ | 76 | 77 | 76 | 77 | 73 | 77 |
| Type of the gas barrier layer | Zytel | Zytel | Zytel | Zytel | Zytel | Zytel |
| Adhesion strength [N/25 mm] | 76 | 72 | 87 | 84 | 65 | 74 |
| Evaluation of the adhesion strength | A | A | A | A | A | A |
| Rubber adhesion [%] | 100 (Thick) | 100 (Thick) | 100 (Thick) | 100 (Thick) | 100 (Thick) | 100 (Thick) |
| Evaluation of the rubber adhesion | A | A | A | A | A | A |
| Delamination test | A | A | A | A | A | A |

|  | Ex. 7 | Ex. 8 | Ex. 9 | Ex. 10 | Comp. Ex. 7 | Comp. Ex. 8 |
|---|---|---|---|---|---|---|
| IIR [part by weight] | 32 |  |  |  |  |  |
| Cl-IIR [part by weight] |  |  |  |  |  |  |
| Br-IIR [part by weight] |  | 18 | 40 | 75 | 35 | 32 |
| BIMS [part by weight] | 13 | 27 | 40 | 5 | 45 | 13 |
| EPDM [part by weight] | 55 | 55 | 20 | 20 | 20 | 55 |
| Carbon black (ISAF) [part by weight] | 50 | 50 | 50 | 50 | 50 |  |
| Carbon black (HAF) [part by weight] |  |  |  |  |  |  |
| Carbon black (FEF) [part by weight] |  |  |  |  |  | 50 |
| Stearic acid [part by weight] | 2 | 2 | 2 | 2 | 2 | 2 |
| Paraffin oil [part by weight] | 5 | 5 | 5 | 5 | 5 | 5 |
| ZnO [part by weight] | 2 | 2 | 2 | 2 | 2 | 2 |
| Brominated alkylphenol formaldehyde resin [part by weight] | 3 | 3 | 3 | 3 | 3 | 3 |
| Minimum Mooney viscosity (Vm) [Mooney] | 52.4 | 51.5 | 62.7 | 63.6 | 63 | 38.7 |
| Extrusion workability | A | A | A | A | A | A |
| $T_B$ [MPa] | 16.2 | 17 | 16.8 | 17.3 | 16.9 | 14.8 |
| $E_B$ [%] | 400 | 335 | 315 | 535 | 310 | 410 |
| $M_{100}$ [MPa] | 4.1 | 5.1 | 5.5 | 2.9 | 5.7 | 3.9 |
| $H_S$ | 76 | 79 | 80 | 75 | 80 | 73 |

TABLE 1-continued

| | | | | | | |
|---|---|---|---|---|---|---|
| Type of the gas barrier layer | Zytel | Zytel | Zytel | Zytel | Zytel | Zytel |
| Adhesion strength [N/25 mm] | 69 | 67 | 59 | 51 | 38 | 36 |
| Evaluation of the adhesion strength | A | A | A | A | C | C |
| Rubber adhesion [%] | 100 (Thick) | 100 (Thick) | 100 (Thick) | 100 (Thick) | 100 (Thick) | 100 (Thick) |
| Evaluation of the rubber adhesion | A | A | A | A | A | A |
| Delamination test | A | A | A | A | B | B |

TABLE 2

| | Ex. 4 | Comp. Ex. 9 | Ex. 11 | Ex. 12 | Comp. Ex. 10 |
|---|---|---|---|---|---|
| IIR [part by weight] | | | | | |
| Cl-IIR [part by weight] | | | | | |
| Br-IIR [part by weight] | 32 | 32 | 32 | 32 | 32 |
| BIMS [part by weight] | 13 | 13 | 13 | 13 | 13 |
| EPDM [part by weight] | 55 | 55 | 55 | 55 | 55 |
| Carbon black (ISAF) [part by weight] | 50 | 25 | 30 | 80 | 85 |
| Carbon black (HAF) [part by weight] | | | | | |
| Carbon black (FEF) [part by weight] | | | | | |
| Stearic acid [part by weight] | 2 | 2 | 2 | 2 | 2 |
| Paraffin oil [part by weight] | 5 | 5 | 5 | 5 | 5 |
| ZnO [part by weight] | 2 | 2 | 2 | 2 | 2 |
| Brominated alkylphenol formaldehyde resin [part by weight] | 3 | 3 | 3 | 3 | 3 |
| Minimum Mooney viscosity (Vm) [Mooney] | 51 | 30 | 32.8 | 85.6 | 95.1 |
| Extrusion workability | A | A | A | A | B |
| $T_B$ [MPa] | 17.2 | 14.6 | 16.8 | 16.2 | 15.9 |
| $E_B$ [%] | 380 | 650 | 620 | 230 | 215 |
| $M_{100}$ [MPa] | 4.5 | 1.8 | 2 | 9.2 | 9.8 |
| $H_S$ | 77 | 65 | 68 | 92 | 95 |
| Type of the gas barrier layer | Zytel | Zytel | Zytel | Zytel | Zytel |
| Adhesion strength [N/25 mm] | 84 | 45 | 51 | 95 | 82 |
| Evaluation of the adhesion strength | A | A | A | A | A |
| Rubber adhesion [%] | 100 (Thick) | 100 (Thick) | 100 (Thick) | 100 (Thick) | 100 (Thick) |
| Evaluation of the rubber adhesion | A | A | A | A | A |
| Delamination test | A | B | A | A | A |

| | Comp. Ex. 11 | Ex. 13 | Ex. 14 | Ex. 15 | Comp. Ex. 12 |
|---|---|---|---|---|---|
| IIR [part by weight] | | | | | |
| Cl-IIR [part by weight] | | | | | |
| Br-IIR [part by weight] | 32 | 32 | 32 | 32 | 32 |
| BIMS [part by weight] | 13 | 13 | 13 | 13 | 13 |
| EPDM [part by weight] | 55 | 55 | 55 | 55 | 55 |
| Carbon black (ISAF) [part by weight] | 50 | 50 | 50 | 50 | 50 |
| Carbon black (HAF) [part by weight] | | | | | |
| Carbon black (FEF) [part by weight] | | | | | |
| Stearic acid [part by weight] | 2 | 2 | 2 | 2 | 2 |
| Paraffin oil [part by weight] | 5 | 5 | 5 | 5 | 5 |
| ZnO [part by weight] | 2 | 2 | 2 | 2 | 2 |
| Brominated alkylphenol formaldehyde resin [part by weight] | 0.5 | 1 | 10 | 15 | 18 |
| Minimum Mooney viscosity (Vm) [Mooney] | 54.8 | 53.2 | 45 | 39.2 | 36.1 |
| Extrusion workability | A | A | A | A | A |
| $T_B$ [MPa] | 7.5 | 15.9 | 16.8 | 16.6 | 16.3 |
| $E_B$ [%] | 765 | 430 | 350 | 325 | 295 |
| $M_{100}$ [MPa] | 1.8 | 4.2 | 4.8 | 4.9 | 5.3 |
| $H_S$ | 65 | 74 | 79 | 84 | 95 |
| Type of the gas barrier layer | Zytel | Zytel | Zytel | Zytel | Zytel |
| Adhesion strength [N/25 mm] | 36 | 65 | 83 | 85 | 82 |
| Evaluation of the adhesion strength | C | A | A | A | A |
| Rubber adhesion [%] | 100 (Thick) | 100 (Thick) | 100 (Thick) | 100 (Thick) | 100 (Thick) |
| Evaluation of the rubber adhesion | A | A | A | A | A |
| Delamination test | B | A | A | A | B |

TABLE 3

| | Comp. Ex. 13 | Comp. Ex. 14 | Comp. Ex. 15 | Ex. 3 |
|---|---|---|---|---|
| IIR [part by weight] | 90 | 50 | | |
| Cl-IIR [part by weight] | | | | |
| Br-IIR [part by weight] | | | 36 | 36 |
| BIMS [part by weight] | | | 9 | 9 |
| EPDM [part by weight] | 10 | 50 | 55 | 55 |
| Carbon black (ISAF) [part by weight] | | | 50 | 50 |
| Carbon black (HAF) [part by weight] | | | | |
| Carbon black (FEF) [part by weight] | 80 | 80 | | |
| Stearic acid [part by weight] | 3 | 3 | 2 | 2 |
| Paraffin oil [part by weight] | 10 | 10 | 5 | 5 |
| ZnO [part by weight] | 2 | 2 | 2 | 2 |
| Brominated alkylphenol formaldehyde resin [part by weight] | 8 | 8 | 3 | 3 |
| Minimum Mooney viscosity (Vm) [Mooney] | 56.5 | 52.6 | 50.5 | 50.5 |
| Extrusion workability | A | A | A | A |
| $T_B$ [MPa] | 10.1 | 11.3 | 17.1 | 17.1 |
| $E_B$ [%] | 600 | 570 | 400 | 400 |
| $M_{100}$ [MPa] | 2.1 | 2.3 | 4.3 | 4.3 |
| $H_S$ | 71 | 71 | 76 | 76 |
| Type of the gas barrier layer | PA6 | PA6 | PA6 | Zytel |
| Adhesion strength [N/25 mm] | 15 | 17 | 20 | 87 |

TABLE 3-continued

|  | Comp. Ex. 13 | Comp. Ex. 14 | Comp. Ex. 15 | Ex. 3 |
|---|---|---|---|---|
| Evaluation of the adhesion strength | C | A | A | A |
| Rubber adhesion [%] | 0 (Boundary) | 0 (Boundary) | 10 | 100 (Thick) |
| Evaluation of the rubber adhesion | B | B | B | A |
| Delamination test | B | B | B | A |

<Test Results>

Comparative Example 1-1 is an embodiment in which the gas barrier layer and the rubber layer had been adhered by using an adhesive. In this case, the rubber adhesion was insufficient, and peeling was observed in the delamination test, and the adhesion between the gas barrier layer and the rubber layer was insufficient (see Table 1).

Comparative Examples 1-2 to 5 are the hoses in which the rubber layer was prepared by using a rubber composition which lacks at least one of the BIMS, the butyl rubber and/or the halogenated butyl rubber, and the EPDM. These hoses were found to experience peeling in the delamination test as well as insufficient adhesion between the gas barrier layer and the rubber layer (see Table 1).

It is to be noted that Comparative Example 1-2, Comparative Example 2, and Comparative Example 3 respectively correspond to the embodiments described in JP 2002-079614 A. Comparative Example 2 also corresponds to the embodiment described in JP 3891718 B.

Comparative Examples 6 and 7 are the hoses in which the rubber layer was prepared by using a rubber composition having the compositional ratio of at least one of the BIMS, the butyl rubber and/or the halogenated butyl rubber, and the EPDM is outside the scope of the present invention. These hoses were found to experience peeling in the delamination test as well as insufficient adhesion between the gas barrier layer and the rubber layer (see Table 1).

Comparative Example 8 is a hose in which the rubber layer was formed by using a rubber composition outside the scope of the present invention prepared by using a carbon black (FEF) which did not satisfy the conditions that the $N_2SA$ is at least 75 m$^2$/g and the DBP absorption is at least 90 cm$^3$/100 g. It was then found that, in such a case, the hose would experience peeling in the delamination test as well as insufficient adhesion between the gas barrier layer and the rubber layer (see Table 1).

In contrast to these Comparative Examples 1-1 to 8, the hoses of the Examples 1 to 10 exhibited high adhesive strength, good rubber adhesion, and no peeling in the delamination test, and in particular, the hoses of Examples 3 and 4 showed best results (see Table 1).

The results of the gas permeability test in Examples 3 and 4 were 3.3 [g/(m×72 h)] for both cases, confirming acceptability of these hoses for the use as refrigerant hoses.

Comparative Example 9 is the case in which the carbon black has been used at 25 parts by weight in relation to 100 parts by weight of the raw rubber, which is outside the scope of the present invention. It was found that, in such a case, the hose would experience peeling in the delamination test as well as insufficient adhesion between the gas barrier layer and the rubber layer (see Table 2).

Comparative Example 10 is the case in which the carbon black has been used at 85 parts by weight in relation to 100 parts by weight of the raw rubber, which is outside the scope of the present invention. In this case, extrusion workability was insufficient.

In contrast to such Comparative Examples 9 and 10, the hoses of Examples 11 and 12 exhibited high adhesive strength, good rubber adhesion, and no peeling in the delamination test (see Table 2). Workability was also sufficient.

Comparative Example 11 is the case in which the brominated alkylphenol formaldehyde resin has been used at 0.50 parts by weight in relation to 100 parts by weight of the raw rubber, which is outside the scope of the present invention. Comparative Example 12 is the case in which the brominated alkylphenol formaldehyde resin has been used at 18 parts by weight in relation to 100 parts by weight of the raw rubber, which is also outside the scope of the present invention. It was found that, in such a case, the hose would experience peeling in the delamination test as well as insufficient adhesion between the gas barrier layer and the rubber layer (see Table 2).

In contrast to these Comparative Examples 11 and 12, Examples 13 to 15 exhibited high adhesive strength, good rubber adhesion, and no peeling in the delamination test (see Table 2).

Comparative Examples 13 to 15 are the embodiment wherein the gas barrier layer was prepared by using PA6, which is outside the scope of the present invention. It was found that, in such a case, these hoses would experience peeling in the delamination test as well as insufficient adhesion between the gas barrier layer and the rubber layer (see Table 3).

It is to be noted that the Comparative Examples 13 and 14 correspond to embodiments in Patent JP 3074700 B.

What is claimed is:

1. A refrigerant hose having an inner layer comprising a gas barrier layer and a rubber layer adhered to an outer surface of the gas barrier layer, wherein
    the gas barrier layer comprises a modified polyamide prepared by blending a polyamide and a carboxyl group-containing modified polyolefin;
    the rubber layer comprises a rubber composition comprising raw rubber, alkylphenol formaldehyde resin in an amount of from 1 to 15 parts by weight based on 100 parts by weight of the raw rubber, and carbon black in an amount of from 30 to 80 parts by weight based on 100 parts by weight of the raw rubber;
    wherein, based on 100 parts by weight of the raw rubber, the raw rubber comprises 5 to 40 parts by weight of a brominated product of a copolymer rubber of an isomonoolefin and a p-alkyl styrene (BIMS, 80 to 20 parts by weight of an ethylene-propylene-diene terpolymer (EPDM), and 15 to 40 parts by weight of a copolymer rubber selected from the group consisting of a butyl rubber, halogenated butyl rubber, and blends thereof; wherein
    the carbon black has a value of $N_2SA$ of at least 75 m$^2$/g as measured according to JIS K 6217-2 and a DBP absorption of at least 90 cm$^3$/100 g as measured according to JIS K 6217-4; and no adhesive layer is formed between the gas barrier layer and the rubber layer.

2. The refrigerant hose according to claim 1 wherein the copolymer rubber is a halogenated butyl rubber.

3. The refrigerant hose according to claim 1, wherein the polyamide is at least one member selected from the group consisting of polyamide 6, polyamide 11, polyamide 12, polyamide 4,6, polyamide 6,6, polyamide 6,10, polyamide 6,12, polyamide MXD-6, and a copolymer of at least two of the foregoing polyamides.

4. The refrigerant hose according to claim 2, wherein the polyamide is at least one member selected from the group consisting of polyamide 6, polyamide 11, polyamide 12, polyamide 4,6, polyamide 6,6, polyamide 6,10, polyamide 6,12, polyamide MXD-6, and a copolymer of at least two of the foregoing polyamides.

* * * * *